United States Patent [19]

Earl

[11] Patent Number: 5,364,512
[45] Date of Patent: Nov. 15, 1994

[54] ELECTROCHEMICAL IONIZATION APPARATUS SYSTEM FOR PURIFYING WATER

[75] Inventor: Floyd Earl, Bedford, Mass.

[73] Assignee: Pure The Ionizer Inc., North Chelmsford, Mass.

[21] Appl. No.: 961,462

[22] Filed: Oct. 15, 1992

[51] Int. Cl.$^5$ .................. C25B 15/00; C02F 1/461
[52] U.S. Cl. .................. 204/228; 204/275; 204/292; 204/293; 204/272; 210/192
[58] Field of Search .......... 204/149, 186, 272, 284, 204/289, 293, 302, 228, 275, 292; 210/748, 243, 192

[56] References Cited

U.S. PATENT DOCUMENTS

| | | |
|---|---|---|
| 3,514,389 | 5/1970 | Stephan et al. ............ 204/272 |
| 4,269,690 | 5/1981 | Graham, III ............... 204/272 |
| 4,341,617 | 7/1982 | King ......................... 204/272 |
| 4,525,272 | 6/1985 | Henson ...................... 204/149 |
| 4,822,472 | 4/1989 | Reis et al. .................. 204/284 |
| 5,088,432 | 2/1992 | Usami et al. ............... 204/148 |
| 5,102,515 | 4/1992 | Ibbott ......................... 204/272 |

Primary Examiner—Peter A. Hruskoci
Assistant Examiner—Robert James Popovics
Attorney, Agent, or Firm—Richard P. Crowley

[57] ABSTRACT

Electrochemical ionization apparatus, system and method for purifying water by the generation of metallic ions, such as copper and silver, which apparatus comprises an ion-generation chamber apparatus composed of an insulating tubular housing, and outer and inner spaced apart, concentric tubular electrodes disposed within the housing and composed of a conductive metallic material, such as copper or a copper alloy, an insulating and interlocking block to insulate and space apart the first and second electrodes and to interlock the electrodes into position, and threaded connectors extending from the outside of the housing through the housing wall, the outer electrode, the block and the inner electrode, and a pair of electrical connectors on the outside of the housing for connection of the housing to a power supply and control source.

19 Claims, 6 Drawing Sheets

ELECTROCHEMICAL IONIZATION APPARATUS SYSTEM FOR PURIFYING WATER

BACKGROUND OF THE INVENTION

Electrochemical ionization systems for purifying water, such as in a swimming pool, are well known. Typically, such electrolytic water purification systems eliminate algae and bacteria from the water, while minimizing or eliminating the need to employ hazardous chemicals, such as chlorine, disinfectants or other toxic chemicals in the pool which normally must be used to disinfect the water. Such electrochemical ionization systems generally employ electrodes, such as electrodes composed of copper, or copper-silver alloys, since copper is a well-known algaecide and silver is also a very powerful bacteriacide. The electrolytic system is connected to a safe, low voltage DC power supply arranged so that as the water flows about the electrodes in an ionization chamber chemical ions of copper and silver are generated, to remain in the solution for a period of time, attacking and killing bacteria and various algae, therefore reducing or eliminating the need for the addition of chemicals to disinfect the pool. In addition, the charged particles generally have a mutual attraction for each other, causing an increase in size or flocculation which moves dead algae or bacteria together and allowing the regular pool filter to remove them from the water. Typically, the ions generated remain in the pool, disinfecting the pool until they are used up in the disinfecting process. The employment of silver, copper and other metallic ions in the solution are effective at very low concentrations, are odorless and tasteless, and do not have damaging side effects, as do chemical disinfectants.

One prior art electrochemical ionizing process employed for the disinfecting and purification of water includes a pair of spaced-apart, copper electrode plates or blades projecting from an insulating threaded base wherein the electrodes are supplied from a power supply and are spaced apart, for example, ⅜ of an inch. The electrodes are generally composed of about 95% copper and about 5% silver. The position of the spacing apart of the electrode blades varies, since a closer distance provides more conductivity and less resistance. Such blades create negative-charged ions of copper and silver to purify the water. Generally, the pool water flows in a perpendicular path to the longitudinal axis of the blade and through the pair of spaced-apart blades, to insure an adequate reaction between the water and the electrodes. Such prior art electrolytic cells are not wholly effective, since the surface area of the spaced-apart, blade-like electrodes is generally small and typically ranges from about 4 to 6 square inches. In addition, the electrode design being of a blade shape requires a turbulent flow past the blades to get sufficient coverage, particularly when a low concentration of negative ions is desired. The employment of turbulent flow in connection with such prior art electrolytic cells is also a disadvantage in creating an excessive load on the water pump.

Another electrochemical ionization system for purifying water is provided, for example, in U.S. Pat. No. 4,525,272 issued Jun. 25, 1985, hereby incorporated by reference. The improved water purification system as described discloses an electrolytic cell composed of an anode, typically comprised substantially of copper, in a wire mesh cathode surrounding the anode and spaced apart therefrom and typically substantially composed of iron. The conduit is attached to the housing of the electrolytic cell to direct the flow of water into the housing perpendicular to the anode and cathode so that the water flows through said wire mesh cathode toward the anode, then is deflected away from and sent in a different direction of flow travel. The power supply and a control unit is employed to cause current to flow between the anode and cathode, and to cause oxygen to be produced and the elements in the water to plate down on the electrode and for the copper electrode to produce a concentration of disinfecting copper ions in the water. As with the prior art electrolytic cell, the ionizing system with the wire mesh cathode also requires turbulent flow of the water to operate, which also causes an excessive load on the pump motor and shortens pump life. The turbulent flow is also needed to insure an adequate interaction between the water and electrodes. A further disadvantage of the described system is that the wire mesh cathode minimizes the surface area of the electrode, reducing efficiency, and the wire mesh cathode tends to wear out fairly rapidly in use.

Therefore, it is desirable to provide for a new and improved electrochemical ionization apparatus, such as an ion-generation chamber, a system employing such an ion-generation chamber, and a method for the electrochemical purifying of water which overcomes some of the disadvantages of prior art systems.

SUMMARY OF THE INVENTION

The invention relates to an electrochemical ionization apparatus, such as an ion-generation chamber, a system containing the ionization apparatus, and a method for purifying water by electrochemical techniques. In particular, the invention concerns an ion-generation chamber apparatus for the generation of ions in water, particularly copper and silver, for water purification purposes, and wherein the electrodes comprise a pair of spaced-apart, concentric electrodes in a housing which provides for in-line non-turbulent water flow.

The electrochemical ionization apparatus of the invention provides for the generation of ions, such as copper, silver, or other metallic ions in water for disinfecting and purification purposes. The apparatus generally comprises a housing, typically a tubular molded plastic housing composed of electrically insulating material, and having an inner surface, an inlet, typically at one end, for the introduction of water to be purified, and an outlet, typically at the other end, for the withdrawal of purified water. The inlet and outlet are located at each end of the longitudinal axis of the housing. Typically, the housing is threaded at both ends to permit its incorporation into a water pumping system. The apparatus includes tubular electrodes in one embodiment and star-shaped, tubular electrodes in an other embodiment, the electrodes composed of a metal material, typically a copper or copper alloy, which is a copper-silver alloy. The electrodes include an outer and an inner electrode, with the inner electrode within the outer electrode and spaced apart therefrom, also composed of a metal material. The electrodes may be composed of the same or different metals with both electrodes capable of acting as an anode and cathode to generate ions to purify water flowing longitudinally through the housing.

The inner and outer electrodes are contained within the housing in a concentric, spaced-apart, electrochemical arrangement with an insulating and interlocking means, such as a plastic strip block, spaced between the inner surface of the outer electrode and the outer surface of the inner electrode, to insulate the spaced-apart first and second electrodes, and to interlock the first and second electrodes together and to the housing in an aligned position. The apparatus includes threaded connector means to secure the insulating interlocked means through the first and second electrodes and also to the inner wall of the housing. The apparatus also includes means, which may also act as the connector means, to connect electrically the first and second electrodes to electrodes on the outside of the housing to a power supply and control unit to provide for an anode electrode and a cathode electrode.

The electrochemical ionization system of the invention generally comprises a power supply, such as a power supply capable of being plugged into ordinary household voltage, and connected to a control unit which sends low voltage DC current to the electrodes and includes a calibrating circuit therein, and a polarity switching circuit with a timer to provide for the polarity-switching on a timed basis of the electrodes from anode to cathode in order to enhance the useful life of the electrodes in the electrochemical ion-generation chamber apparatus. The polarity-switching circuit is connected to an ion-generation chamber and to the electrodes therein. Typically, the housing containing the electrodes is placed within a pool or other piping system, and water is introduced along the longitudinal axis of the housing from the inlet to the outlet, and circulated into the swimming pool or other apparatus wherein disinfected water is desired.

The electrochemical ionization apparatus and system of the invention does not require that the flow through the in-line ion chamber system be turbulent, but rather permits laminar flow, thus reducing the load on the water pump. In addition, the design, either a cylindrical or star-shaped design as illustrated, provides for increased surface area over prior art systems, therefore providing greater efficiency in generating more ions per current unit. The ion-generation apparatus of the invention therefore permits laminar in-line water flow, and provides enhanced surface area. This apparatus is a compact, rugged, easily manufactured and assembled device which is easily accommodated into standard plumbing piping systems.

In one embodiment, the inner and outer concentrically spaced-apart electrodes comprise spaced-apart copper tubes separated by the plastic insulating and interlocking block means within the insulating housing. In another embodiment, the spaced-apart first and second electrodes comprise a star-like arrangement, wherein the outer electrode includes a plurality of generally uniformly, spaced-apart, radially, inwardly-extending ribs, extending toward the inner electrode and wherein the second, inner, concentric electrode also includes a plurality of generally uniformly, spaced-apart, outwardly-extending ribs, typically but not necessarily, extending between the inwardly-extending ribs of the outer electrode. The star-shaped embodiment provides for slightly more complex inner and outer electrodes and requires careful positioning of the electrodes, but the inwardly- and outwardly-extending ribs provide for enhanced surface area over the use of concentric tubular electrodes.

The insulating and interlocking means generally is composed of an insulating-type material, typically of molded plastic material, such as polyvinyl chloride resin, as used in the outer housing, and generally comprises a bar-like or block shade, having a plurality, typically of four, holes therein, the holes designed to provide for threaded connectors which extend between the inner and outer electrodes to the outside of the housing, and the other two holes adapted to provide for threaded connectors which extend through the outer housing and into the inner and outer electrodes respectively to secure the electrodes in position. Generally, the insulator interlock means may include a plurality of raised bosses on one surface so as to aid in the positioning of the first and second electrodes through the use of the bosses fitting into mating holes in the inner and outer electrodes. In addition, and optionally, the inner surface of the outer housing may include an elongated boss or flange therein to provide a defined, spaced-apart water flow space between the inner surface of the housing and the outer surface of the outer electrode. Therefore, the insulating interlocked means may also optionally serve as a positioning means to aid in the assembly of the inner and outer electrodes within the housing.

The apparatus includes a plurality, typically, for example four, threaded connectors which extend from the outside surface of the housing inwardly, with at least one connector going through an enlarged hole in the outer electrode to avoid electrical contact with the outer electrode and to be threaded into the inner electrode, while at least one other threaded connector threadably connects the outer electrode, and provides for electrode leads on the outside of the housing. The threaded connectors are employed to thread into threaded holes in the inner and outer electrodes through holes in the insulating or interlocking block means to retain the inner and outer electrodes, and the block means in position within the housing. Two of the threaded connectors on the outside of the housing are then connected to the power supply and control unit of the electrochemical ionizing system to provide cathode and anode electrodes.

The method of the invention is directed to a method for the purification of water, such as the disinfection of water for swimming pools; however, it also may be employed for the disinfection of water in hot tubs, spas and fountains, or in portable de-ionizer reverse osmosis-type water machines to provide safe drinking water.

The method includes providing a pair of spaced-apart, generally parallel, concentric generally tubular or rib-containing first and second electrodes within an insulating housing, providing a power supply to the inner and outer electrodes to form an anode and cathode, with the electrodes typically, for example, being of copper or a copper alloy, and pumping water generally along the longitudinal axis of the housing, generally, but not necessarily, in laminar flow from the inlet to the outlet of the housing.

The invention will be described for the purposes of illustration only in connection with certain embodiments; however, it is recognized that various modifications, changes, additions and improvements may be made to the illustrated embodiments by those persons skilled in the art all falling within the spirit and scope of the invention.

DESCRIPTION OF THE EMBODIMENTS

Figure 1:
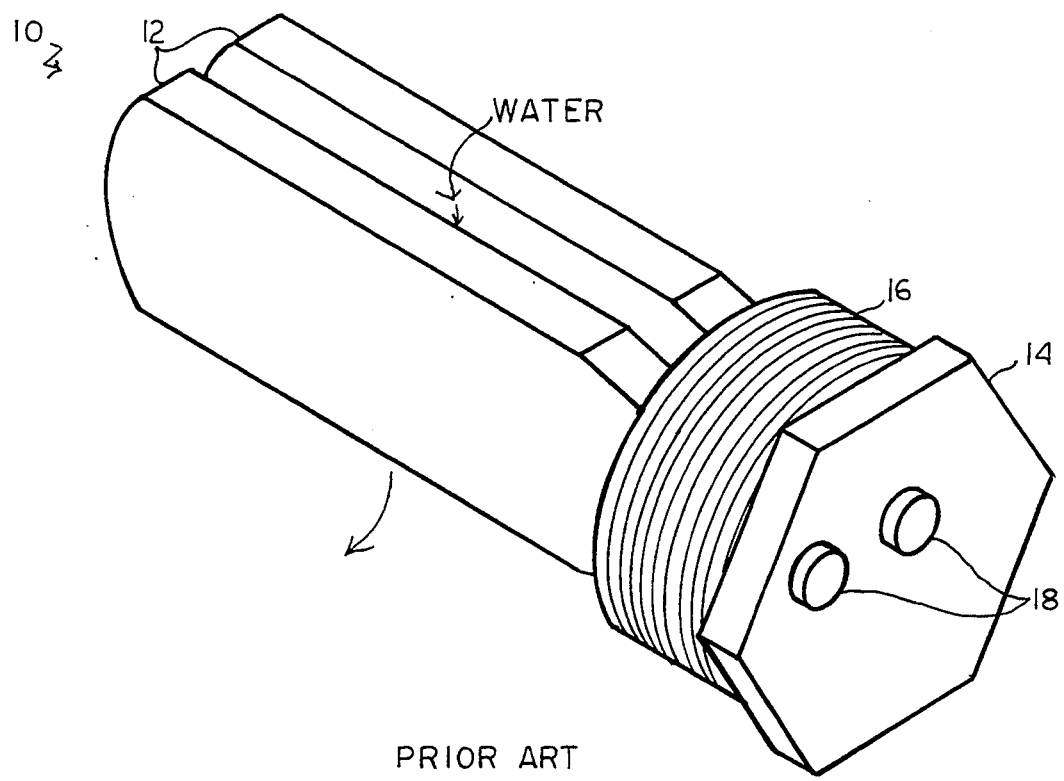
FIG. 1 is a perspective view of a prior art, blade-type ion-generation apparatus.

FIG. 1 is a perspective view of a prior art ionizer apparatus 10 having a hexagonal nut head 14 connected to a threaded base 16 with the spaced-apart electrode blades 12 projecting outwardly from an electrically insulated base 16 with anode and cathode terminals 18 on the nut head 14 for connection to a power supply. The blades are composed of copper or a copper-silver alloy of about 95% copper and about 5% silver. The threaded base 16 is threaded into a water supply piping system of a swimming pool with water passing in a turbulent flow path about and between the blades 12. Current flow between the electrode blades produces copper and silver ions in the water, which act to kill algae and bacteria in the water. The prior art ionizer apparatus 10, for effective operation, requires the turbulent flow of water generally perpendicularly to the longitudinal axis of the blades 12 and is restricted in electrode surface area due to the nature of the blades 12.

Figure 2:
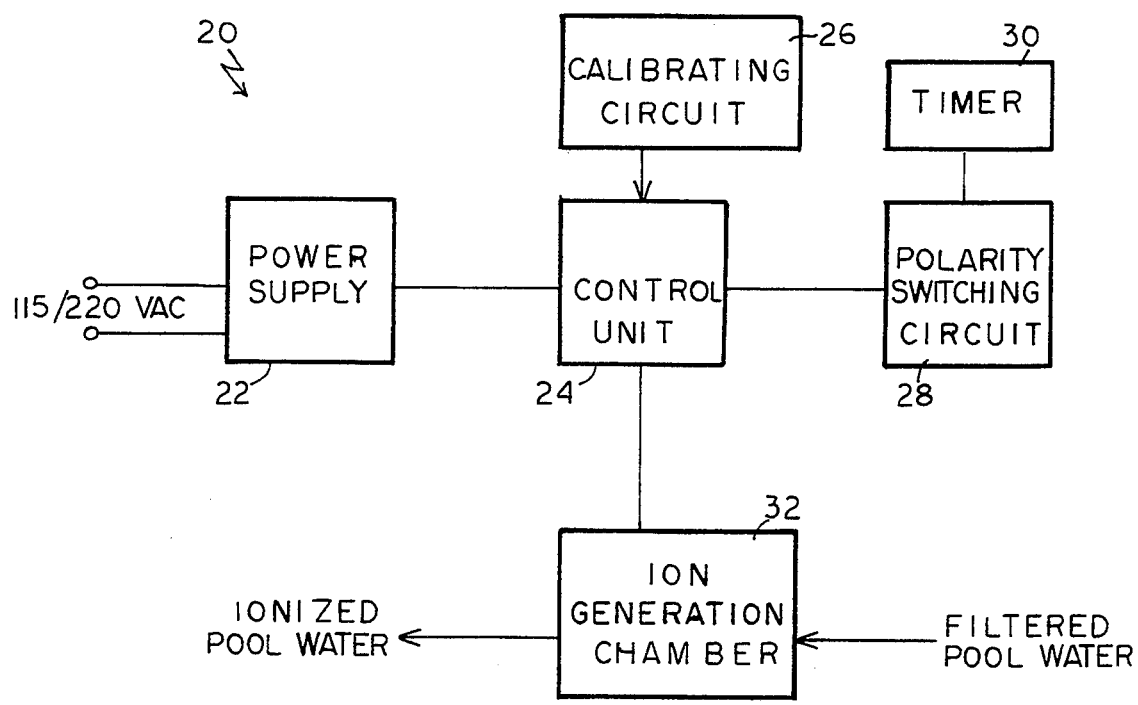
FIG. 2 is a schematic block flow diagram illustrating the operation of the electrochemical ionization system of the invention.
Figure 3:
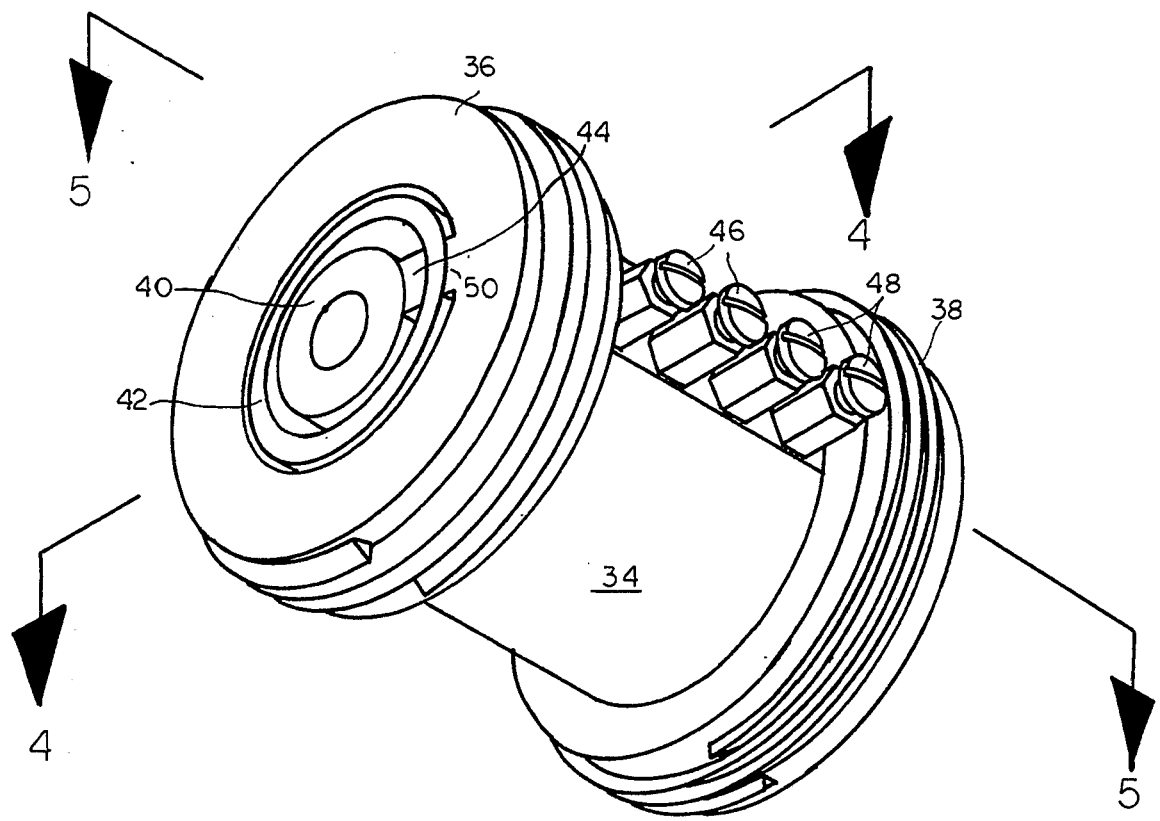
FIG. 3 is a perspective view from above of one embodiment of the ion-generation chamber apparatus of the invention.
Figure 4:
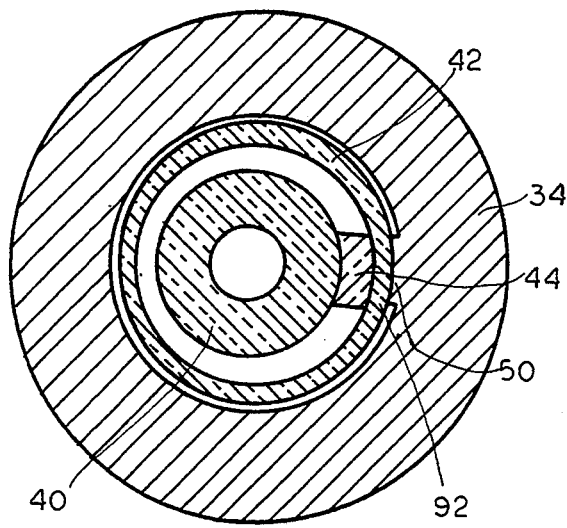
FIG. 4 is a sectional view along line 4—4 of the apparatus of FIG. 3.
Figure 5:
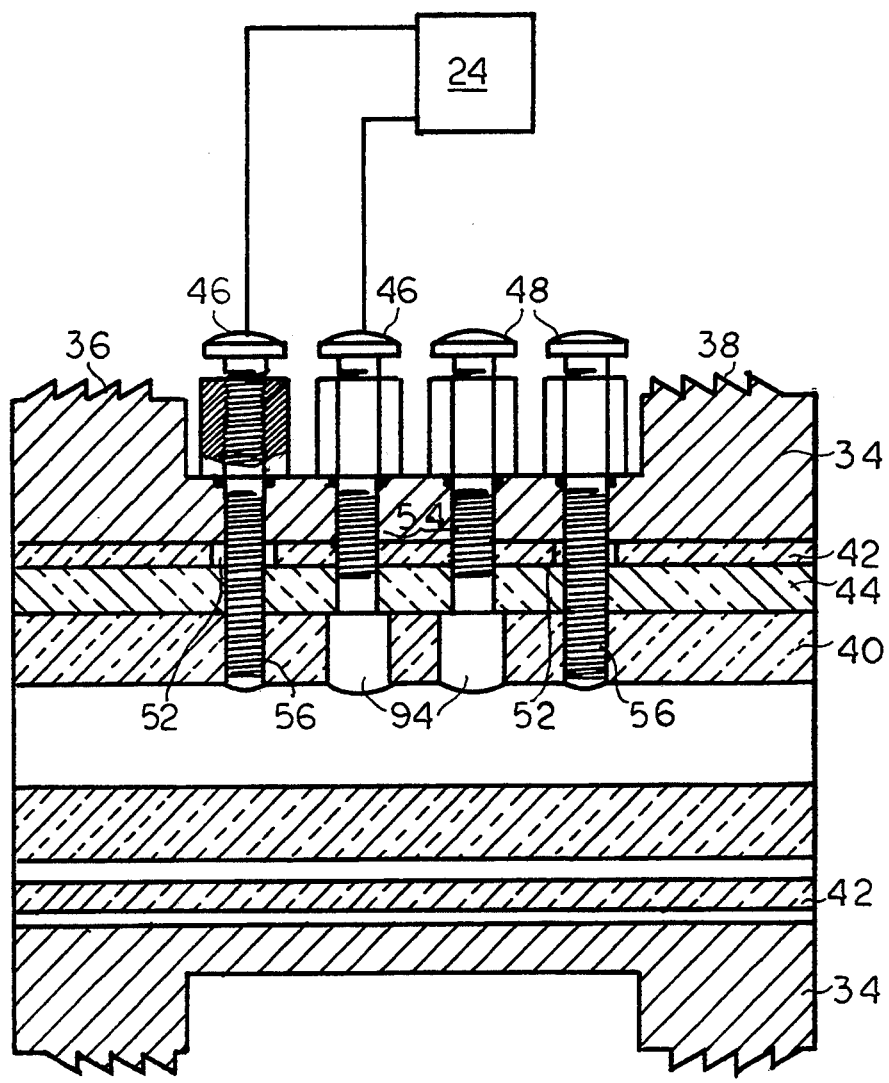
FIG. 5 is a sectional view of the apparatus of FIG. 3 along line 5—5.
Figure 6:
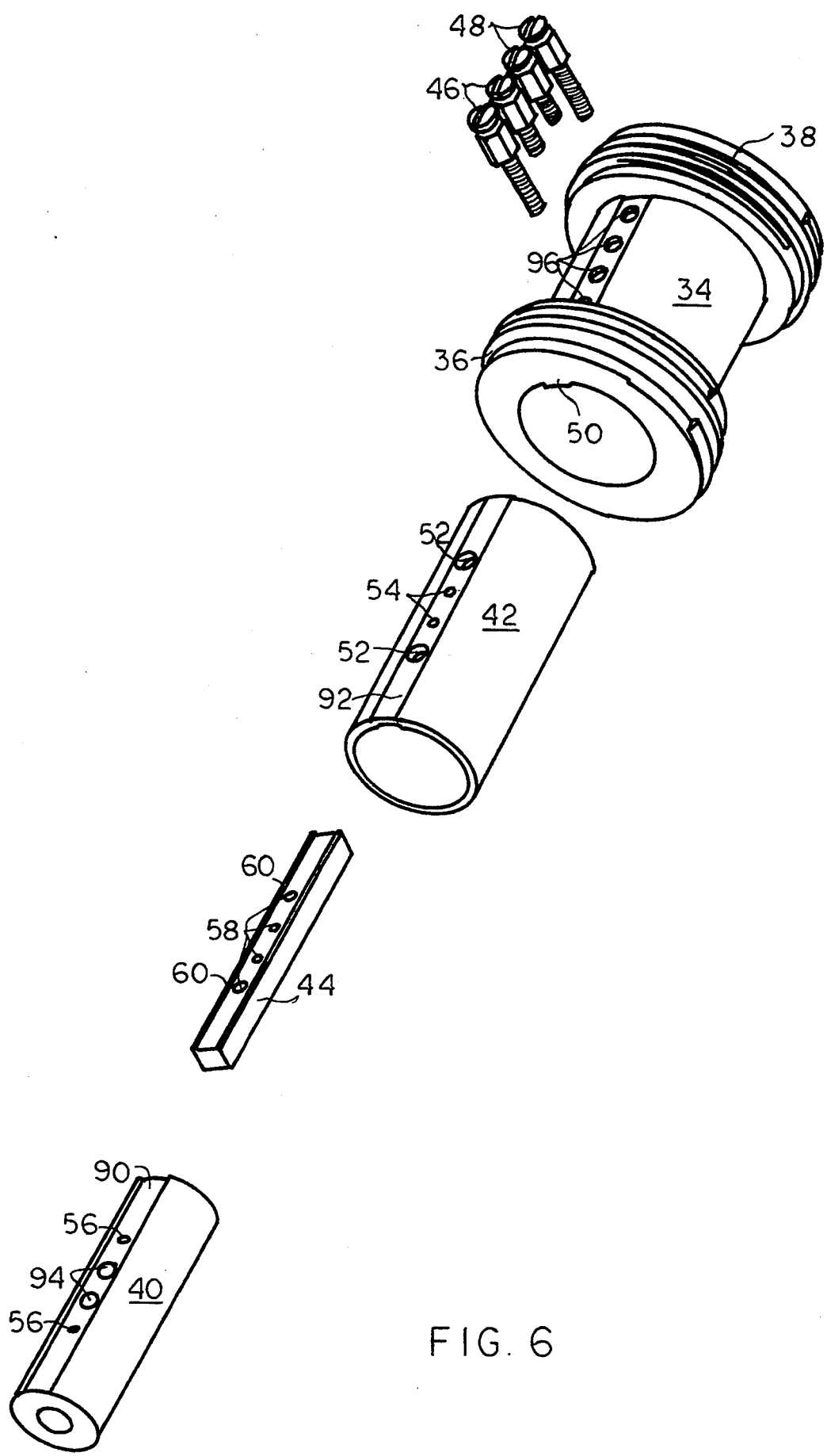
FIG. 6 is an exploded view of the ion-generation chamber apparatus of the invention of FIG. 3.

FIG. 2 is a schematic block flow diagram of a swimming pool ionizer system 20 which comprises a power supply 22 connected to a standard AC power source, e.g. 115/220 VAC. The power supply 22 is connected to an electronic control unit 24 to provide 0–24 DC voltage. A calibrating circuit 26 provides for the calibration of the control unit 24 based on the electrical conductivity of the water, so that a user may adjust the starting point on a zero basis of the ion-generation chamber 32, which provides ionized water. The calibrating circuit permits adjustment for the differences in conductivity of water which may exist in different towns or geographic areas. In use, a calibrating dial is provided to a user for calibrating and adjustment of the calibrating circuit accomplished by a screw-type adjustable potentiometer. A polarity switching circuit 28 and a timer 30 are connected to the control unit 24 to provide for timed reversal of polarity of the electrodes in the ion-generation chamber 32 in order to extend electrode life.

The timing of the reversal of polarity may vary, but typically, in the ion-generation chamber 32, the reversal of polarity usually ranges in time from 1 to 10 minutes, for example 1 to 3 minutes.

With reference particularly to FIGS. 3, 4, 5 and 6 there is shown an ion-generation chamber apparatus 32 having a molded plastic electrically insulating housing 34; e.g., of polyvinl chloride (PVC), shown with exterior threaded ends 36 and 38, so that the housing may be threadably inserted in a water line to permit in-line laminar flow of water to pass longitudinally through the interior of the housing 34. The apparatus 32 includes therein an inner tubular electrode 40 and a concentric, spaced-apart outer cylinder 42, each of a copper or copper-silver alloy. The electrodes 40 and 42 are separated by an insulating and interlocking elongated block 44 of an electrically insulating material, such as molded PVC resin, which block 44 has four spaced-apart holes 58 therethrough, which holes 58 are aligned with mating holes 52 and 54 in the outer electrode 42, with the outer cylinder 42 having two enlarged holes 52 and two threaded holes 54 in an elongated, flattened area 92. The inner electrode 40 includes two threaded holes 56 and two large, non-threaded holes 94 in an elongated flattened area 90 adapted to receive the block 44 therein. The block 44 includes four non-threaded holes 58 which are aligned with the four holes 52 and 54 of the outer electrode 42 and two of which holes 58 are aligned with the two holes of the electrode 40. The block includes two slightly upwardly-raised circular bosses 60 on the upper surface of the block 44 which are adapted to snap fit into the enlarged holes 52 of the outer cylinder 42 to aid in the assembly of the block 44 between the inner 40 and outer 42 electrodes. Block 44 includes two raised bosses on the opposite or bottom surface which are adjusted to snap fit into the large holes 94 in the inner electrode 40 to aid in assembly of the electrodes 40 and 42 within the housing 34.

Four hexagonal nut threaded metal connector bolts 46 and 48, two of short length and two of longer length, with elastomeric washers are employed to secure the inner cylinder electrode 40, the outer cylinder electrode 42 and the insulating block 44 in a concentric, spaced-apart position within the housing 34. The housing 34 includes four holes 96 arranged in mating alignment with the four holes of the outer electrode 42, the four holes 52 and 54 of the block 44, and the holes 56 and 94 of the inner electrode 40. The connector bolts 46 and 48 are threadably connected by one bolt 46 and one bolt 48 to the inner cylinder 40 passing through the housing hole 96, and the large holes 52 of the outer electrode 42 and holes 58 on block 44 to secure the inner electrode 40 in position with the one bolt 46 and the other bolt 48 threadably secured in holes 54 of the outer cylinder. The two short connectors 46 and 48 pass through housing holes 96 and threadably secured the outer electrode 42 in position within the housing 34 with the flat area 92 placed on ridge 50 for use in assembly and to provide a defined, spaced-apart water flow area about the outer surface of the outer electrode. In the assembly, the raised bosses 60 on block 44 are snap fitted into holes 52 of outer electrode 42 and the raised bosses on the lower surface of block 44 are snap fitted into holes 94 of the inner electrode. The flat area 92 of the outer electrode placed on ridge 50 within the housing, and the connectors 46 and 48 used to secure the outer electrode 42, the insulator block 44, and the inner electrode 40 within and to housing 34. The two electrodes 40 and 42 are concentrically secured within the cylindrical interior of housing 34, spaced apart by insulating interlocking block 44, and with one connector bolt 46 or 48 connected to the inner and outer electrodes 40 and 42 to form electrical connectors for the power supply 22 and directly to control unit 24, so that the inner and outer cylinders may act as anode and cathode electrodes in operation.

In operation, a laminar or turbulent flow of water is directed longitudinally into the housing 34 and about each surface of the inner and outer electrodes 40 and 42 so that current flow between the electrodes 40 and 42 cause the formation of copper and silver ions in the water which act to kill bacteria and algae in the water. The design of apparatus 32 optimizes the electrode surface area and provides a direct, straight in-line laminar flow of water through the housing 34 which reduces fluidic resistance or load on the pump motor.

Figure 7:
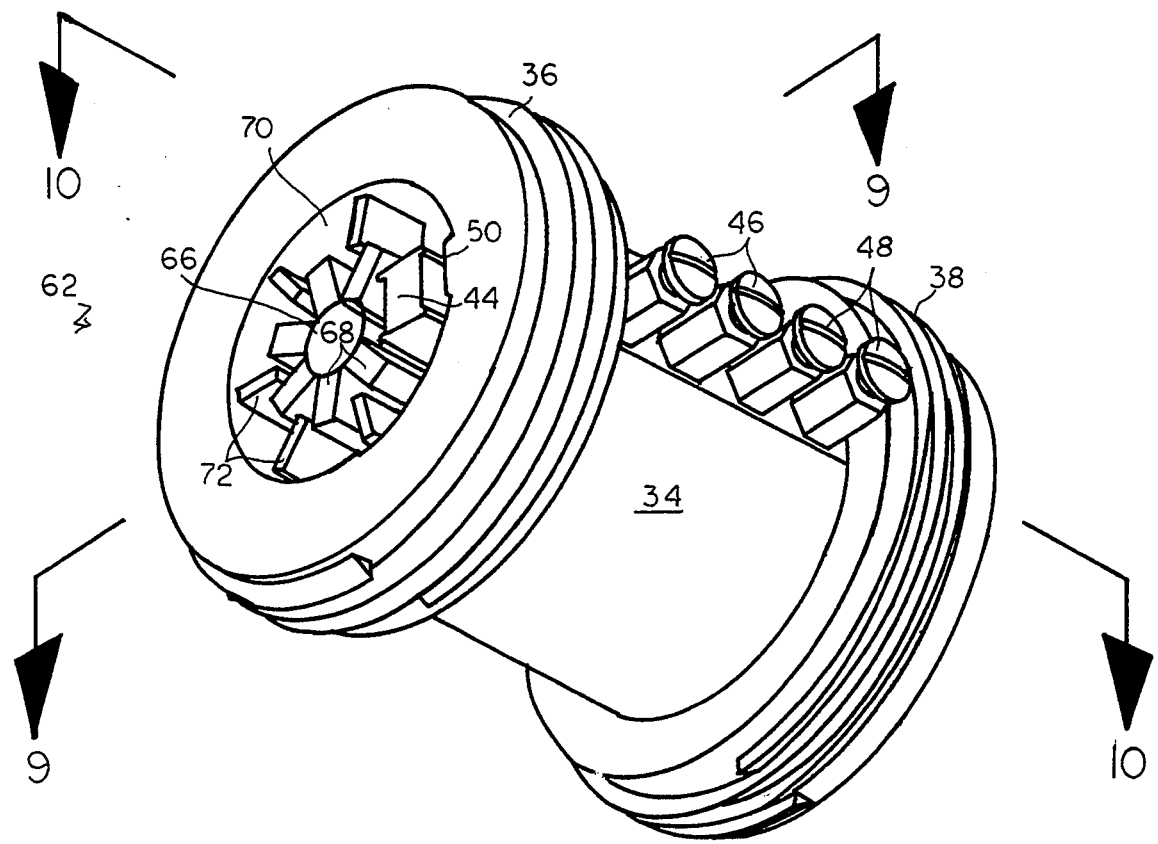
FIG. 7 is a perspective view from above of another embodiment of the ion-generation chamber apparatus of the invention.
Figure 8:
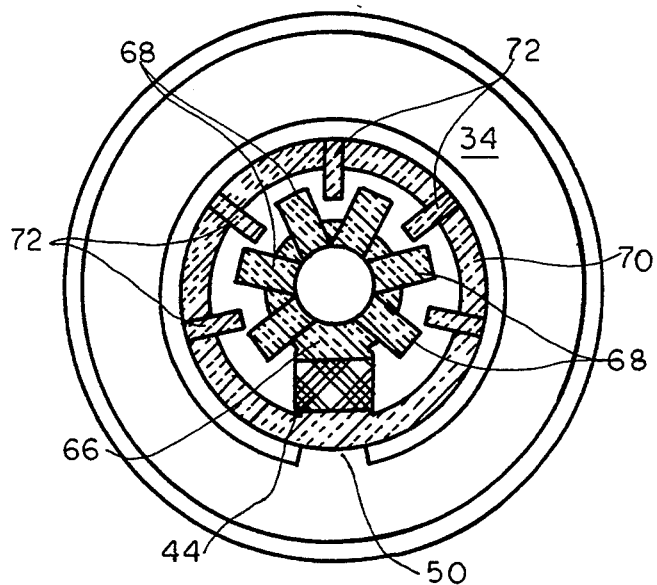
FIG. 8 is a sectional view along the line 8—8 of the apparatus of FIG. 7.
Figure 9:
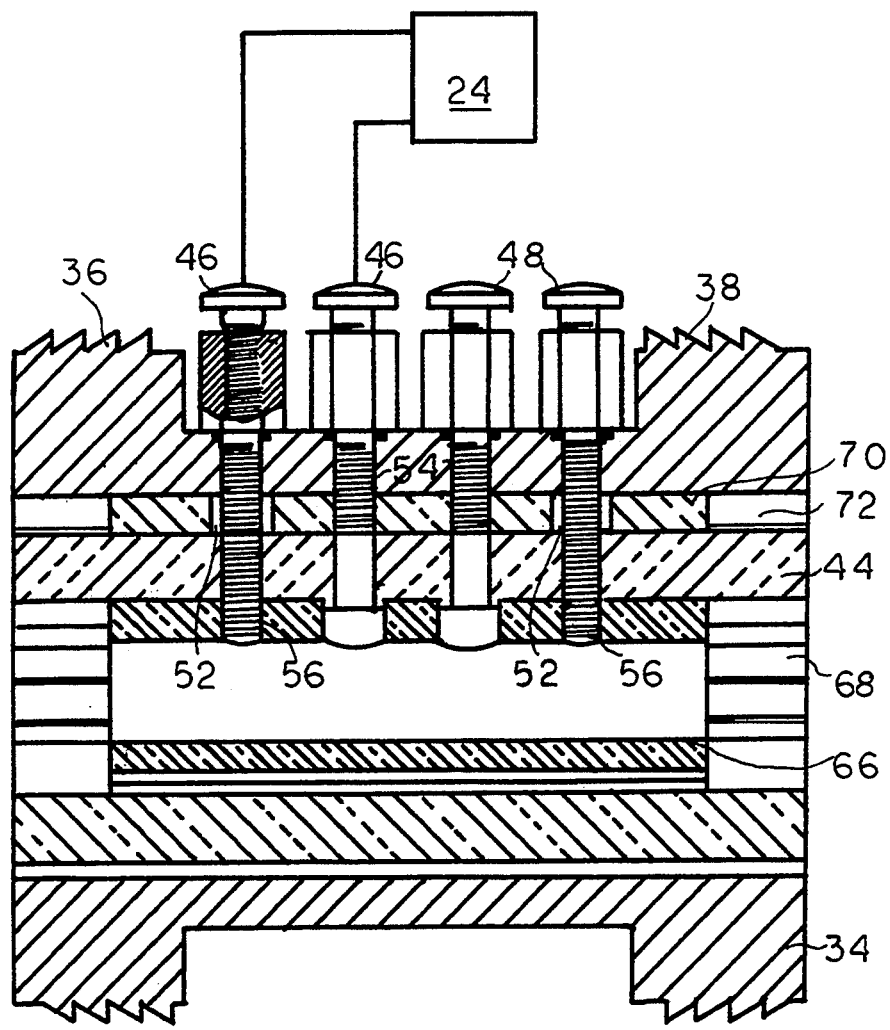
FIG. 9 is a sectional view along the line 9—9 of the apparatus of FIG. 7.

With reference to FIGS. 7, 8 and 9, there is shown and illustrated another embodiment of the ion-generation chamber apparatus 64 which provides for increased electrode surface area. The apparatus 64 is similar to apparatus 32 in its structure, assembly and operation, except apparatus 64 includes an outer tubular electrode 70 with a plurality of inwardly-extending, integral, uniformly spaced-apart ribs 72 and an inner tubular electrode 66 with a plurality of outwardly-extending uniformly spaced-apart ribs 68, the inner ribs 68 and the outer ribs 72 of about the same extension distance and designed so the ribs 68 and 72 are spaced generally intermediate each other and in total extension distance of about the same as the distance between the interior surface of the outer 70 and the exterior surface of the inner 66 cylinder electrodes. The employment of the rib 66 and 72 into the longitudinal flow path of the water substantially increases the effective electrode surface area and increases the efficiency of the apparatus 64 to generate copper and silver ions for water purification and increases electrode life.

The ion-generation chamber apparatus described and illustrated efficiently purifies water passing through the apparatus, optimizes the effective surface area of the electrodes, permits the use of laminar flow through the apparatus, and reduces fluidic resistance in the pumping of water therethrough.

I claim:

1. An ion-generation chamber apparatus for the generation of metallic ions in water for purification purposes, which apparatus comprises:
    a) a housing having an inner and outer surface composed of electrically insulating material and having an inlet for the introduction of water to be purified and an outlet aligned with the inlet for the withdrawal of purified water;
    b) a first outer tubular electrode composed of a metal material within the housing and spaced apart from the inner surface of the housing, the first electrode having a plurality of generally uniformly spaced apart, inwardly extending radial rib elements;
    c) a second inner tubular electrode within the outer electrode and concentrically spaced apart therefrom, composed of a metal material, the second electrode having a plurality of generally uniformly spaced apart, outwardly extending radial rib elements and positioned generally between the inwardly extending rib elements of the first electrode, both electrodes capable of serving as an anode or a cathode to generate metallic ions to purify water;
    d) insulating and interlocking means extending between the inner and outer electrodes to insulate the spaced apart first and second electrodes from each other, and to interlock the first and second electrodes together into the housing;
    e) means to secure the first and second electrodes and the intervening insulating and interlocking means within the housing; and
    f) electrical connector means to provide for electrical connections between the first and second electrodes to the outside of the housing, the said connector means adapted to be connected to a power supply to provide an anode electrode and a cathode electrode within the housing.

2. The apparatus of claim 1 wherein the electrodes are composed of copper or a copper-silver alloy.

3. The apparatus of claim 1 wherein the housing comprises a molded plastic cylinder with threads on each end for coupling into a water pipe system, and the first and second electrodes longitudinally aligned with the axis of the housing.

4. The apparatus of claim 1 wherein the electrical connector means includes a first threaded electrical connector which extends from the outside of the housing through an insulated hole in the surface of the first electrode and into a threaded hole in and into electrical contact with the second electrode, and wherein a second threaded electrical connector means extends from the outer surface of the housing into a threaded hole in the outer electrode.

5. The apparatus of claim 1 wherein the electrical connector means to connect electrically the inner and outer electrodes are the same as the means to secure the inner and outer electrodes and the insulating interlocking means together within the housing.

6. The apparatus of claim 1 wherein the insulating and interlocking means comprises an elongated block member having an upper and lower surface containing a plurality of holes extending therethrough, including a plurality of outwardly surface-extending bosses on the upper and lower surface, and wherein the first and second electrodes contain a plurality of holes therein, and wherein the bosses of the insulating and interlocking means are adapted to snap fit into mating holes in the inner and outer electrodes to aid in the assembly and aligned position of the inner and outer electrodes with an insulating, interlocking means.

7. The apparatus of claim 1 wherein the inner surface of the housing include an elongated longitudinal raised ridge thereon to define a water flow space between the outer surface of the first electrode and the inner surface of the housing.

8. The apparatus of claim 7 wherein the raised ridge comprises a flattened area and wherein the inner and outer surfaces of the first electrode and the outer surface of the second electrode include an elongated, longitudinal flattened areas to aid in the assembly of the apparatus.

9. The apparatus of claim 7 wherein the insulating and interlocking means comprises an elongated, plastic block with a plurality of holes therein, having a generally flat upper and lower surface adapted to be positioned on and between the inner surface flat area of the first electrode and the outer surface flat area of the second electrode.

10. The system of claim 9 which includes a polarity-switching circuit and a timer means for reversing polarity of the first and second electrode at periodic, timed intervals.

11. The apparatus of claim 1 wherein the first electrode includes a plurality of holes therethrough, at least one hole sufficiently large in diameter to permit the passage of an electrical connector means therethrough to the second electrode without electrical contact with the first electrode.

12. An electrochemical system which includes the apparatus of claim 1 and a power supply and control system, electrically connected to said apparatus to provide an anode electrode and cathode electrode for the generation of metallic ions for the purification of water.

13. The apparatus of claim 1 wherein the insulating and interlocking means comprise a non-conductive, elongated block member which extends substantially the length of the first and second electrodes and having a flat first surface secured to a flat surface portion of an inner surface of the first electrode and a flat, opposing second surface secured to a flat surface portion of an outer surface of the second electrode and generally positioned intermediate between a pair of rib elements.

14. The apparatus of claim 13 wherein the rib elements of the first and second electrodes extend between and beyond the extension distance of each intermediate pair of rib elements.

15. The apparatus of claim 1 wherein all the rib elements of the first and second electrode extend about the same radial distance.

16. The apparatus of claim 1 wherein the rib elements of the first and second electrode are equal in radial extension distance and have a total extension distance as the distance between the interior surface of the first, outer tubular electrode and the exterior surface of the second, inner tubular electrode.

17. The apparatus of claim 1 wherein the rib elements are generally rectangular in shape.

18. The apparatus of claim 17 wherein the first electrode has five rib elements, the second electrode has six rib elements, and the rib elements of the second electrode are greater in width than the rib elements of the first electrode with all rib elements having about the same radial extension distance.

19. The apparatus of claim 1 wherein the rib elements of the first electrode are positioned generally intermediate the rib elements of the second electrode.

* * * * *